United States Patent Office 3,390,417
Patented July 2, 1968

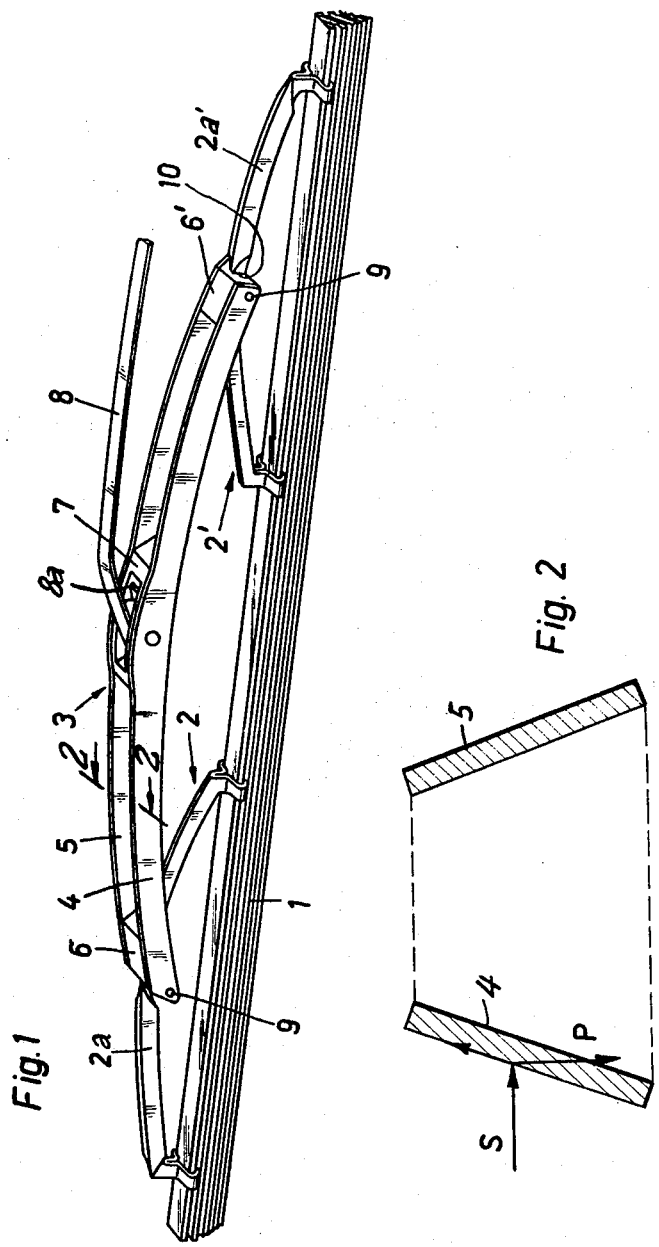

3,390,417
WINDSHIELD WIPER CONSTRUCTION
Alfred Kohler and Willy Bock, Bietigheim, Wurttemberg, Germany, assignors to SWF-Spezialfabrik fur Autozubehor Gustav Rau G.m.b.H., Bietigheim, Wurttemberg, Germany
Filed May 13, 1966, Ser. No. 549,958
Claims priority, application Germany, Oct. 8, 1965, S 99,992
5 Claims. (Cl. 15—250.42)

This invention relates in general to the construction of windshield wipers, and in particular to a new and useful windshield wiper having wiper blade supporting stirrups which are constructed to decrease the lifting effects thereon and is particularly applicable for vehicles which travel at very high speed.

Due to the high speeds achieved by the present day cars, it is absolutely necessary to provide a satisfactory view for the driver. It is a fact that a wiper is subjected to lifting forces at high speed due to the air currents which act on it which can become greater than the bearing pressure of the wiper blade on the windshield, so that the wiper blade detaches itself from the windshield as it operates so that the windshield is no longer satisfactorily cleaned. Attempts have been to design windshield wipers which will not react in this manner. For example, some structural parts of the blade assembly have been made with openings through which the air currents may pass in order to attempt to reduce the lift acting thereon.

The present invention is an improvement over the prior art devices, particularly in respect to the simplicity of the construction of the mounting parts for the wiper blades which are provided with sidewalls which are sloped to minimize any lifting effect thereon due to the air currents. For this purpose, the longitudinal walls of the wiper blade supporting stirrups are advantageously made of narrow srtips which are connected by spacers such that they slope downwardly and outwardly toward the wiper blade. The longitudinal walls, together with the spacers, form a substantially frame-like structure and air which strikes a sidewall thereof will have a substantially inward or windshield directed force component toward the wiper blade which will counteract any lift effect which may be acting on the blade itself. With such a stirrup construction, it has been found that the blade will operate with an improved contact with the windshield during all normal wind conditions at high speeds.

Accordingly, it is an object of the invention to provide an improved wiper blade construction including a supporting stirrup for the blade which includes inclined walls shaped to provide a force component under the action of wind which will negate any lifting effects on the windshield wiper blade.

A further object of the invention is to provide a windshield wiper which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a top perspective view of a windshield wiper and mounting mechanism constructed in accordance with the invention;

FIG. 2 is a sectional view taken along the line 2—2 of FIG. 1 indicating the forces acting on the stirrup member of the wiper blade.

Referring to the drawings in particular, the invention embodied therein comprises a wiper blade element or strip 1 which is secured at its outer end to two intermediate stirrups 2 and 2' located adjacent each end. The intermediate stirrups 2 and 2' are secured centrally to respective ends of a main stirrup generally designated 3. The main stirrup 3 is formed of two longitudinally elongated flat walls or strips 4 and 5 which are held apart by the spacers 6 and 6' at their respective ends by a central spacer 7. The central spacer 7 also provides a supporting connection for the hook-shaped end 8a of a wiper blade supporting arm 8.

In accordance with the invention, the sidewalls 4 and 5 are oriented by the spacers 6, 6' and 7 such that they are inclined upwardly in the form of a roof. In order to facilitate this construction, the spacer sidewalls are correspondingly inclined.

In a preferred construction, the intermediate stirrups 2 or 2' are also provided with a roof-shaped outer lever arm formation 2a and 2a'. They are retained in slots 10 defined on the respective spacers 6 and 6' by rivets 9' which extend therethrough. The inclination of the walls 4 and 5 from the vertical is made to run from only a slight inclination up to as great as 45°.

As can best be seen in the sectional view of FIG. 2, a pressure head is formed by the air currents S which produce a downward force component P because of the inclination of the longitudinal sidewalls 4 and 5. The component P opposes the lift produced by air acting primarily on the rubber element or blade 1 of the windshield wiper.

While a specific embodiment of the invention has been shown and described in detail to illustrate the application of the inventive principles, it will be understood that the invention may be embodied otherwise without departing from such principles.

What is claimed is:
1. A windshield wiper construction comprising an elongated wiper blade, a stirrup supporting said blade adjacent its ends, said stirrup being open at the top and at the bottom and having sidewalls which are inclined toward each other in a roof form with the wider spacing between said walls facing said wiper blade.

2. A windshield wiper construction according to claim 1, wherein each of said walls of said stirrup are inclined from the vertical by an angle greater than 0° and less than 45°.

3. A windshield wiper construction according to claim 1, including intermediate stirrups connected to each end of said stirrup and engaged at each end of its ends to said blade.

4. A windshield wiper construction according to claim 3, wherein said intermediate stirrups are formed with sidewalls which converge in a direction away from said blade.

5. A windshield wiper construction according to claim 1, wherein said stirrup includes end spacers separating said walls at each end, and a separate spacer separating the central portion of said stirrup, said central spacer defining means for facilitating support of said stirrup by a wiper supporting arm.

References Cited
UNITED STATES PATENTS
2,937,393   5/1960   Brueder _____ 15—250.42

CHARLES A. WILLMUTH, *Primary Examiner.*